(12) United States Patent
Homchaudhuri

(10) Patent No.: US 7,974,626 B2
(45) Date of Patent: Jul. 5, 2011

(54) METHOD AND APPARATUS FOR IMPROVING SUCCESS RATE AND TIME OF CALL SETUP FOR A MOBILE STATION EXPERIENCING HIGH INTERFERENCE

(75) Inventor: Sandip Homchaudhuri, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 374 days.

(21) Appl. No.: 12/342,144

(22) Filed: Dec. 23, 2008

(65) Prior Publication Data

US 2010/0159929 A1 Jun. 24, 2010

(51) Int. Cl.
*H04W 36/00* (2009.01)
(52) U.S. Cl. ......... 455/436; 455/434; 455/502; 370/503
(58) Field of Classification Search .................. None
See application file for complete search history.

(56) References Cited

U.S. PATENT DOCUMENTS

| 6,507,568 | B2 * | 1/2003 | Kumar et al. ................. 370/329 |
| 6,785,510 | B2 * | 8/2004 | Larsen ........................ 455/11.1 |
| 7,761,122 | B2 * | 7/2010 | HomChaudhuri ............ 455/574 |
| 2005/0048982 | A1 | 3/2005 | Roland et al. |
| 2005/0079870 | A1 | 4/2005 | Rick et al. |
| 2008/0125120 | A1 * | 5/2008 | Gallagher et al. ......... 455/435.2 |
| 2009/0252099 | A1 * | 10/2009 | Black et al. .................... 370/329 |

FOREIGN PATENT DOCUMENTS

| WO | 0059255 A1 | 3/2000 |
| WO | 2005025263 A1 | 3/2005 |
| WO | 2005039230 A1 | 4/2005 |

* cited by examiner

*Primary Examiner* — Ajit Patel
(74) *Attorney, Agent, or Firm* — Sylvia Chen

(57) ABSTRACT

A method and apparatus may improve success rate and time of call-setup while a mobile station is experiencing high interference. The method checks (255) if a mobile station is experiencing high-interference. This may occur when the mobile station fails to decode a paging channel of a serving cell (235) to read a first page. Upon determining that the mobile station is experiencing high-interference, the mobile station selects a set of cells (260) having the same location area identifier as the serving cell from a list of top neighboring cells, and selects a cell (265) from the set of cells, and synchronizes (270) with a base station of the selected cell. After synchronizing, the mobile station decodes the paging channel of the selected cell (275) and reads a second page from the paging channel of the selected cell including identical information data as the first page.

24 Claims, 5 Drawing Sheets

| CELL IDENTITY 510 | LOCATION AREA IDENTIFIER 520 | Q-BIT LAG 530 | FN LAG 540 | TOTAL LAG 550 |
|---|---|---|---|---|
| 106 | LA1 | +1000 | 8 | 41000 |
| 112 | LA1 | -2600 | 11 | 52400 |
| 116 | LA1 | +2520 | 10 | 52520 |
| 152 | LA2 | +2000 | 9 | 47000 |
| 154 | LA2 | +2500 | 6 | 32500 |

METHOD AND APPARATUS FOR IMPROVING SUCCESS RATE AND TIME OF CALL SETUP FOR A MOBILE STATION EXPERIENCING HIGH INTERFERENCE

FIELD OF THE DISCLOSURE

The present disclosure relates generally to wireless communication systems and, more particularly, to a technique for improving the success rate and time of call-setup for a mobile station experiencing high-interference.

BACKGROUND

In a wireless communication system, a network's coverage area is divided into a number of cells, and each cell is served by a particular base station belonging to that cell. The mobile stations located in each cell can be registered with the base station of that particular cell. The cell acts as a serving cell for all the registered mobile stations in that cell, and the base station of the serving cell is called the serving base station. Subsequently, as a mobile station moves from one cell to another, the serving cell and the serving base station keeps changing in a process generally known as handoff or reselection. Handoff occurs when a mobile is engaged in an active call and moves to another cell. On the other hand, reselection occurs when the mobile is in an idle mode and moves to another cell.

All the base stations in a network are connected to a mobile telephone switching office (MTSO). The MTSO groups a number of cells together to form different location areas identified using different Location Area Identifiers (LAI). Although the MTSO does not know the exact serving cell and serving base station for a mobile station, it knows the location area identifier of the mobile station.

Whenever there is an incoming call for a mobile station, the MTSO sends the notification information of the incoming call to all the base stations having the current location area identifier of the mobile station. All the base stations in that location area, further, broadcast the incoming call notification information at pre-determined times over their respective paging channels. The mobile station already knows the particular times in the paging channel when the base station might broadcast information for that mobile station. The mobile station, subsequently, decodes the paging channel only of its serving cell, at pre-determined intervals, to check if there is an incoming call intended for it.

In an example of GSM (Global System for Mobile communication), the pre-determined intervals at which the mobile station tries to decode the paging channel is based upon a network parameter BS_PA_MFRMS. BS_PA_MFRMS provides the number of multi frames between two transmissions of the same page to the mobile stations. And in an example of CDMA (Code Division Multiple Access), the pre-determined interval is based upon a parameter Slot Cycle Index (SCI). These parameters are network parameters and are provided to the mobile station by the serving base station.

Due to various reasons, the mobile station may fail to correctly decode the paging channel of the serving base station. In one example, the Received Signal Strength Indication (RSSI) may be low, and subsequently, the mobile station is not able to correctly decode the paging channel of the serving base station. In such a scenario, the mobile station performs a conventional reselection algorithm and switches to another base station with a better RSSI and then decodes the paging channel of another base station to read a subsequent page.

In another example, the decoding failure may occur, not due to a low RSSI, but because the mobile station is experiencing high-interference. While experiencing high-interference, the mobile station may fail to decode the paging channel due to high bit error rate (BER) caused by interference, improper system planning, etc. In such a scenario, the conventional mobile station decrements a counter and again tries to decode the paging channel of the serving base station. In the case of GSM, this counter is called the Downlink Signaling Counter (DSC) and is derived by the mobile station using the information received from the base station in the parameter BS_PA_MFRMS. Whenever the mobile station is unable to correctly decode the paging channel of the serving cell when RSSI is adequate, then the mobile station decrements the counter and tries decoding the paging channel again. After the value of the counter becomes less than zero, the mobile station triggers a full scan and switches to another base station. Thus, in a high-interference situation, the mobile station may not be able to correctly decode the paging channel for a duration that is equal to the time for "n" successive decoding failures plus the time taken by the mobile station for scanning the whole network, re-camping to another base station, and decoding the paging channel of the newly selected base station. This leads to longer call-setup times because the call is set up only after the mobile station is able to correctly decode an incoming call notification on the paging channel.

In one example, the newly selected base station may belong to a new location area identifier. In this case, the newly selected base station will not immediately receive notification information of the incoming call for the mobile station. Subsequently, the mobile station will perform a location update with the MTSO after re-camping to the new base station, which belongs to a new location area identifier. As a result of the location update, the MTSO will know the current location area identifier of the mobile station and then the MTSO sends the notification information of the incoming call to all the base stations in the current location area identifier of the mobile station. This scenario further increases the duration for call-setup by adding the time required for a location update procedure and can lead to missed incoming call notifications.

Therefore, in the case of high-interference, when the paging channel includes notification information of an incoming call and the mobile station is not able to correctly decode the paging channel, the mobile station may miss an incoming call notification or incur a long call-setup time. Accordingly, there is an opportunity for a method and apparatus for improving success rates and times of call-setup for mobile stations experiencing high-interference.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is an example of a table showing time-lag between a serving base station and top neighboring base stations in accordance with some embodiments.

Figure 1:
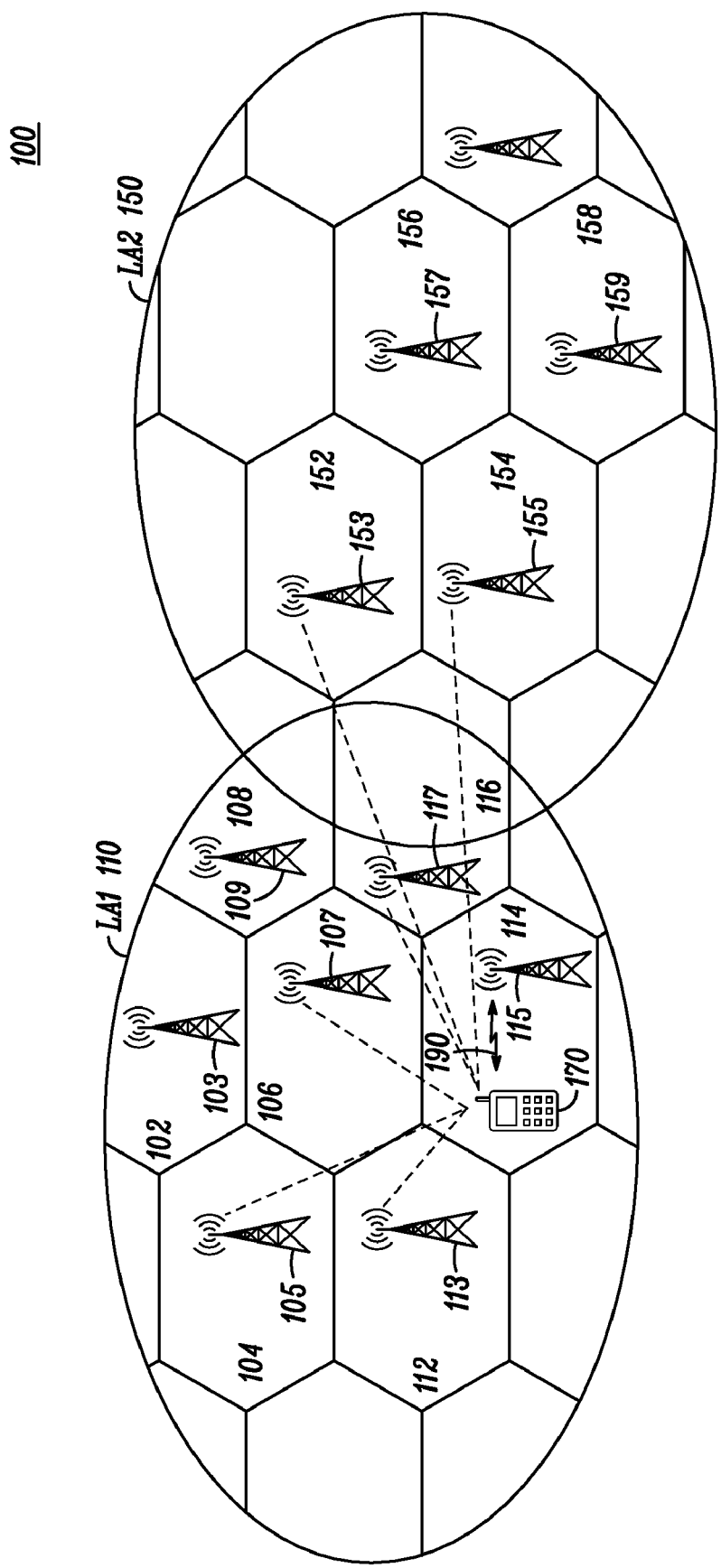
FIG. 1 is a system diagram of a wireless communication system with various cells and base stations in different location areas and a mobile station in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A mobile station checks if the mobile station is experiencing high-interference; presumably the mobile station has failed to correctly decode a paging channel of its serving cell to read a first page. Upon determining that the mobile station is experiencing high-interference, the mobile station selects a cell from a pre-created list and synchronizes with a base station of the selected cell. The selected cell has the same location area identifier as the serving cell. After synchronizing, the mobile station decodes the paging channel of the selected cell and reads a second page from the paging channel of the selected cell.

Conventionally, an MTSO pages the notification information of an incoming call for the mobile station to all the base stations having the current location area identifier of the mobile station. Therefore, the first page from the serving cell and the second page from the selected cell both include the same information. As a result, instead of unsuccessfully trying to decode the paging channel of the serving base station repeatedly until a counter decreases to zero, the mobile station makes use of the fact that the MTSO pages the notification information of an incoming call to all the base stations having the current location area identifier of the mobile station, and decodes the paging channel of the selected cell to read the page. Thus, by decoding the paging channel of the selected cell upon failing to decode the paging channel of the serving base station (and determining that the mobile station is experiencing high-interference), the mobile station may improve success rates of call-setup and reduce call-setup times.

FIG. 1 is a system diagram of a wireless communication system 100 with various cells and base stations in different location areas and a mobile station 170 in accordance with some embodiments. The coverage area of the wireless communication system 100 is divided into a number of cells 102, 104, 106, 108, 112, 114, 116, 152, 154, 156, 158 and each cell is served by a particular base station 103, 105, 107, 109, 113, 115, 117, 153, 155, 157, 159. In the example of FIG. 1, different cells 102, 104, 106, 108, 112, 114, 116, 152, 154, 156, 158 are served by their respective base stations 103, 105, 107, 109, 113, 115, 117, 153, 155, 157, 159. The base stations 103, 105, 107, 109, 113, 115, 117, 153, 155, 157, 159 are further connected to an MTSO (not shown). A few of the cells 102, 104, 106, 108, 112, 114, 116 are grouped in a first location area (the location area identifier for the first location area is LA1) 110 and a few other cells 152, 154, 156, 158 are grouped in a second location area (the location area identifier for the second location area is LA2) 150.

The wireless communication system 100 of FIG. 1 also includes a mobile station 170 present in a cell 114 and served by a base station 115 of the cell 114. The mobile station 170 and the base station 115 communicate with each other using a radio link 190. Therefore, the cell 114 is the serving cell and the base station 115 is the serving base station for the mobile station 170.

Figure 2:
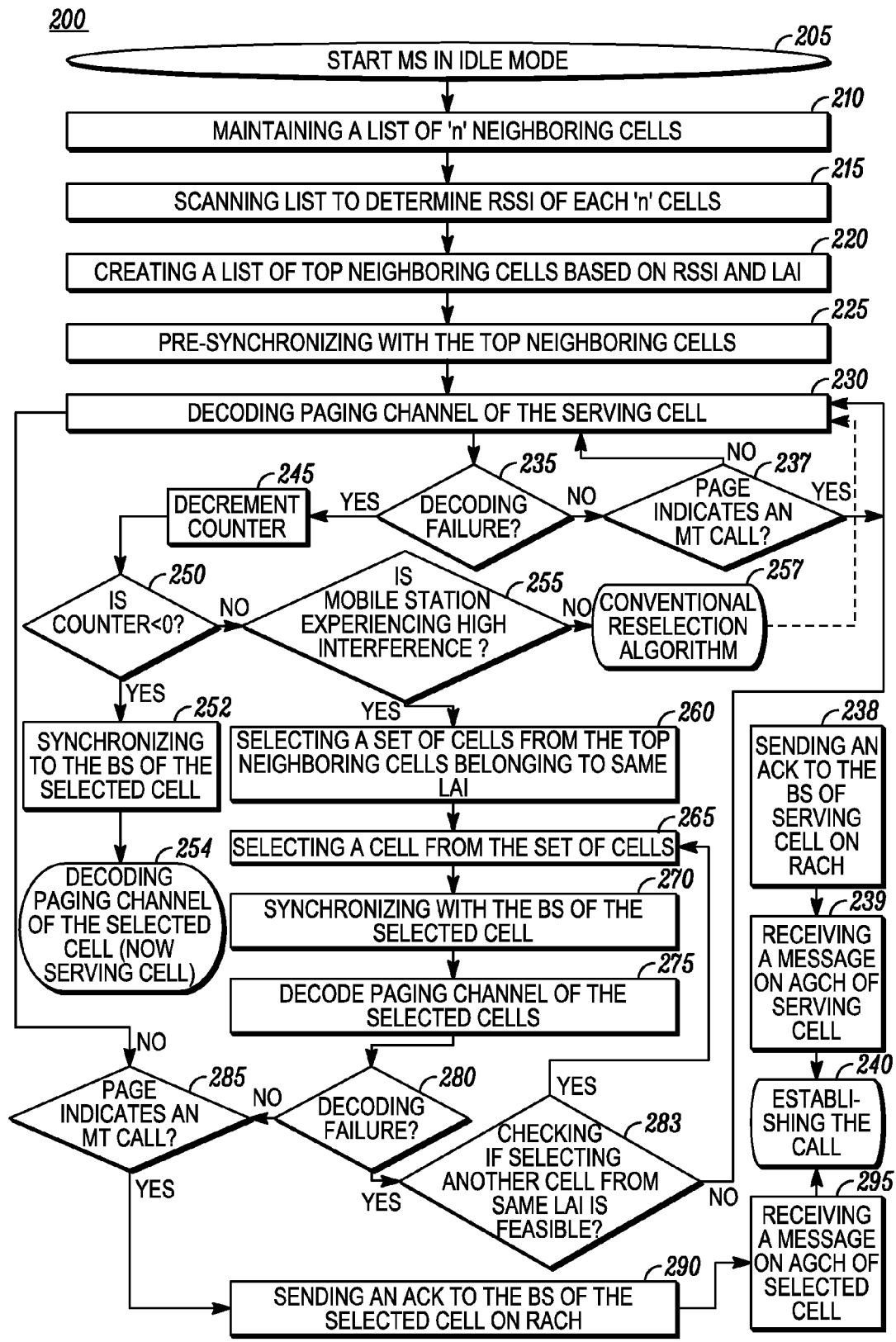
FIG. 2 is a flowchart of a method for a mobile station to improve success rate and call-setup time when experiencing high-interference in accordance with some embodiments.

FIG. 2 is a flowchart 200 of a method for a mobile station (such as the mobile station 170 shown in FIG. 1) to improve success rate and call-setup time when experiencing high-interference in accordance with some embodiments. The method starts when the mobile station is in idle mode 205. In one example, the mobile station is in idle mode when the mobile station is synchronized with a serving base station (such as the base station 115 shown in FIG. 1) and the mobile station is not in any call.

In idle mode 205, the mobile station maintains 210 a list of a number of neighboring cells (such as the cells 104, 106, 112, 116, 152, 154 of FIG. 1). Then, the mobile station scans 215 all the cells in the list to determine the Received Signal Strength Indication (RSSI) values and Signal-to-Noise Ratio (SNR) values of all the neighboring cells. In one example, the mobile station reads the system information of the cells in the list and determines the RSSI values and SNR values. The system information also informs the mobile station about the location area of each cell using a Location Area Identifier (LAI). In another example, the mobile station may scan the list and only determine the RSSI value and the LAI of the cells in the list (without the SNR value being determined). The LAI of a cell informs the mobile station about the location area of the cell. Therefore, as a result of scanning, the mobile station has information about the RSSI values, SNR values, and location area identifiers (LAIs) of all the cells in the list of neighboring cells.

Now, the mobile station creates 220 a list of top neighboring cells (such as the cells 106, 112, 116, 152, 154 of FIG. 1) based on the RSSI value and the LAI of each cell. In one example, the mobile station creates this list of top neighboring cells by selecting cells from the list of neighboring cells that have the highest RSSI values. The mobile station includes at least one cell (such as cell 106, 112, or 116 of FIG. 1) belonging to the LAI (such as LA1 110 of FIG. 1) of the serving cell (such as the cell 114 of FIG. 1) in the list of top neighboring cells, even if the RSSI value of the cell belonging to the LAI of the serving cell is less than the RSSI value of another cell belonging to a different location LAI. When the list of top neighboring cells does not contain any cell belonging to the location area identifier of the serving cell due to any reason, then the mobile station goes to decoding 230 the paging channel of the serving cell and reverts to conventional behavior.

In another example, the mobile station creates this list of top neighboring cells by selecting cells from the list of neighboring cells based on different combinations of RSSI values and LAIs of each cell.

After creating 220 the list of top neighboring cells (that includes a cell belonging to the LAI of the serving cell), the mobile station pre-synchronizes 225 with the top neighboring cells and, subsequently, obtains the time-lag of the top neighboring cells (such as the cells 106, 112, 116, 152, 154 of FIG. 1) with respect to the serving cell (such as the cell 114 of FIG. 1). The mobile station, as a result of obtaining the time-lag, is able to correctly predict the re-occurrence of a page in the base stations of the cells having the same location area identifier as the serving cell of the mobile station. In other words, the mobile station is able to evaluate the time required before an identical page is repeated in one of the cells with the same location area identifier as the serving cell.

Figure 4:
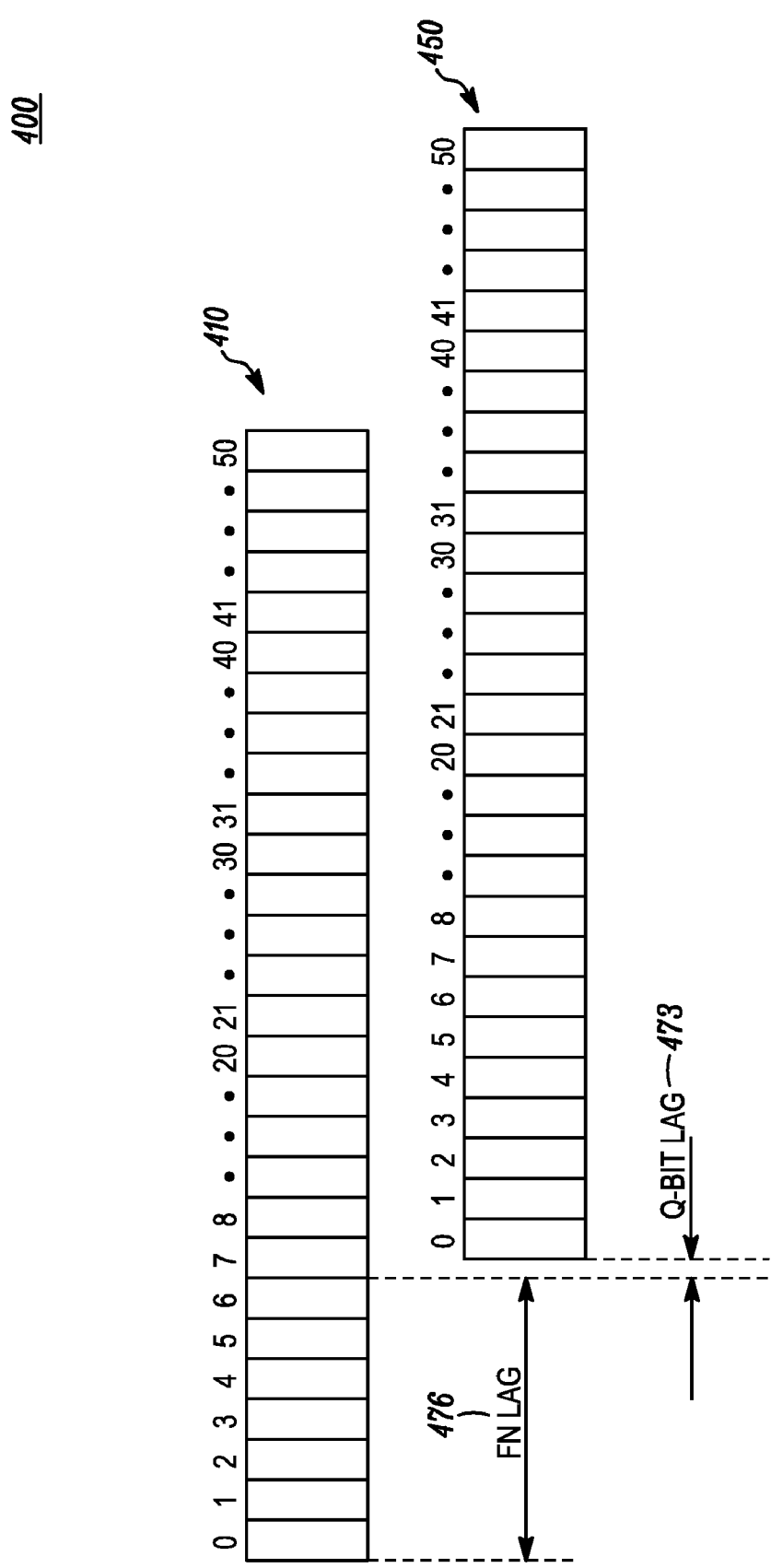
FIG. 4 is an example of multi-frames on beacon carriers of two base stations in accordance with some embodiments.

In an example of GSM, the time-lag is a resolution of a quarter bit (Q_bit) lag 473 and a frame number (FN) lag 476 as shown in FIG. 4. Knowledge of the FN lag provides coarse timing adjustments and knowledge of the Q_bit lag provides fine timing adjustments. FIG. 4 is an example of multi-frames 400 on beacon carriers of two base stations. FIG. 4 shows the multi-frames 410 of the serving base station (such as the base station 115 shown in FIG. 1) and the multi-frames 450 of a neighboring base station (such as the base station 113 shown in FIG. 1). In the example of FIG. 4, each multi-frame 410, 450 includes 51 frames, numbered from 0 to 50.

In an example of GSM, the first two frames (frame 0 and frame 1) of the beacon carriers are allocated for cell synchronization purposes (logically called a Frequency Correction CHannel (FCCH) and a Synchronization CHannel (SCH)) and the block of next four frames (frame 2 to frame 5) are allocated for cell system information (logically called a Broadcast Control CHannel (BCCH)). The mobile station receives the parameter BS_PA_MFRMS in frames 2 to 5, which are allocated for cell system information. All the other frames (frame 6 onwards) are used for access grant and paging (logically called an Access Grant CHannel (AGCH) and a Paging CHannel (PCH)). However, every 10$^{th}$ frame is again allocated for cell synchronization purposes (FCCH and SCH repetition). In GSM, every message transfer between a base station and a mobile station occurs in terms of "blocks," which always use up four consecutive frames. Thus, page information will always come in a block of 4 consecutive frames. Hence, in the above example, frame 6 to frame 9 may be a paging message block (i.e., a paging channel that may contain notification information about an incoming call), frame 10 and 11 may be allocated for cell synchronization purposes, frame 12 to frame 19 (that is, two blocks) may be two paging message blocks, and so on. This whole format repeats in each multi-frame (i.e., after 51 frames). Now, inside one multi-frame 410, 450, there may be a total of 9 individual paging message blocks. And each mobile station knows in which of the 9 blocks, its serving base station sends paging information for that particular mobile station. The BS_PA_MFRMS indicates to the mobile station the number of multi-frames (of 51 frames each) to skip before its paging frame is repeated. Hence, using the BS_PA_MFRMS and the individual paging block information, the mobile station knows when to tune in the channel and receive the paging information. The same location for the paging information is applicable for all the cells belonging to the LAI of the serving cell. Therefore, as long as there is a time lag between the serving base station and another same-LAI base station, the mobile station with knowledge of the time-lag can always get the same paging information from the other base station.

Referring back to FIG. 4, in this example, the mobile station can read a first frame (frame 0) of the neighboring base station after it has read the eighth frame (frame 7) of the serving base station. Therefore, the FN lag 476 between the serving base station and the neighboring base station is 8. If a valid paging block starts at frame 6 of the serving base station, then the valid paging block will also re-occur at frame 6 of the neighboring base station—in the time scale of the serving base station, that would map to its 6+8=14$^{th}$ frame. So, the mobile station, while attached to a serving base station, would know exactly the frame interval where it needs to look for the paging block as repeated in the neighbor cell. Similarly, the mobile station also calculates a Q_bit lag 473 within a frame between the serving base station and the neighboring base station. In this manner, the mobile station obtains the time-lag between the serving base station and all the top neighboring cells.

FIG. 5 is an example of a table 500 showing time-lag between the serving base station and the top neighboring base stations. The table includes different columns showing a cell identity 510, a location area identifier 520, a Q_bit lag 530, an FN lag 540, and a total time-lag 550 of each of the top neighboring cells (such as the cells 106, 112, 116, 152, 154 of FIG. 1). In the example of FIG. 5, the cell with the identity 106 having the same location area identifier LA1, has a +1000 Q_bit lag, 8 FN lag, and 41000 total time-lag. In the example of FIG. 5, each frame has 5000 Q_bits, as per GSM standard. Therefore, the total time-lag in unit of Q_bit is calculated by multiplying the FN lag by 5000 and adding the result to the Q_bit lag (Total time-lag=FN lag*5000+Q_bit lag). Similarly, the cell with the identity 112 having the same location area identifier LA1, has a −2600 Q_bit lag, 11 FN lag, and 52400 total time-lag. The cell with the identity 116 having the same location area identifier LA1, has a +2520 Q_bit lag, 10 FN lag, and 52520 total time-lag. The cell with the identity 152 having the same location area identifier LA2, has a +2000 Q_bit lag, 9 FN lag, and 47000 total time-lag. And the cell with the identity 154 having the same location area identifier LA2, has a +2500 Q_bit lag, 6 FN lag, and 32500 total time-lag. In the example of FIG. 5, all the neighboring cells have been shown to have a positive time-lag, which means that all the neighboring cells get their specific frame after a positive delay from the same specific frame in the serving base station. A negative time-lag may also be possible in the field for some of the neighboring cells having the same location area identifier LA1.

We now return to FIG. 2. After pre-synchronizing and obtaining 225 the time-lag between the serving base station and all the top neighboring cells, the mobile station decodes 230 a paging channel of the serving cell to read a first page. In one example, the first page may include data about incoming call notification for the mobile station. The MTSO sends this data about the incoming call notification to all the base stations of the cells having the same location area identifier as the serving cell of the mobile station. Therefore, by knowing the time-lag of all the top neighboring cells, the mobile station knows the exact Q_bit and the exact frame in the multi-frames where the identical information data (indicating call notification) will recur in the top neighboring cells having the same location area identifier as the serving cell.

Now, the mobile station determines 235 if a decoding failure has occurred. If the mobile station determines that no decoding failure has occurred and the mobile station is able to correctly decode the paging channel of the serving cell and read the first page, then the mobile station checks 237 if the page indicates a mobile terminated call. If the page indicates a mobile terminated call, then the mobile station sends an acknowledgement 238 to the base station of the serving cell on a Random Access CHannel (RACH) and, subsequently, receives a message 239 from the base station of the serving cell on an Access Grant CHannel (AGCH). The message informs the mobile station about a dedicated traffic channel in the serving cell and, finally, the mobile station establishes the call 240. Otherwise, if the page does not indicate a mobile terminated call, than the mobile station again goes back to decoding 230 the paging channel of the serving cell.

Alternatively, if the mobile station determines that a decoding failure has occurred and the mobile station is not able to correctly decode 235 the paging channel of the serving cell, then the mobile station decrements a counter 245 of the serving base station. As explained earlier, in case of GSM, this counter is called Downlink Signaling Counter (DSC) and is derived by the mobile station using the information received from the serving base station in a parameter BS_PA_M-FRMS. In one example, the initial value of this counter is always greater than zero. After decrementing the counter, the mobile station checks if the counter is less than a pre-determined value. This pre-determined value may be set by a manufacturer of the mobile station or by the serving base station. In the example of FIG. 2, the pre-determined value is set to zero.

If the mobile station determines 250 that the counter is not less than zero, then the mobile station checks 255 if it is experiencing high-interference. In one example, the mobile station determines that it is experiencing high-interference if there has been no sudden drop in RSSI value of the serving base station. In another example, the mobile station determines that it is experiencing high-interference, if there is a sudden drop in RSSI value of the serving base station, but there is a more drastic drop in the SNR value of the serving base station. In yet another example, the mobile station may store the RSSI values and the SNR values of the serving base station over a period of time and run an algorithm on the stored values to determine if the mobile station is experiencing high-interference. It is understood for those skilled in the art that a number of different algorithms may be used on the RSSI values and the SNR values (and possibly additional or alternate variables) to determine if the mobile station is experiencing high-interference.

If the mobile station determines that it is not experiencing high-interference, then the mobile station runs the conventional re-selection algorithm 257 and selects a new cell and a corresponding new base station. Note that if the reselection algorithm results in selection of a completely new serving cell, the flowchart 200 can restart at step 205. If the reselection algorithm results in selection of the same serving cell as the "new" serving cell, the flow can go directly to step 230 (i.e., the mobile station can skip performing 210, 215, 220, and 225).

On the other hand, if the mobile station determines that it is experiencing high-interference, then the mobile station selects 260 a set of cells (such as the cells 106, 112, 116 of FIG. 1) from the list of top neighboring cells based on the location area identifier (such as LA1 of FIG. 1). At this point, the mobile station only selects the cells (such as the cells 106, 112, 116 of FIG. 1) having the same LAI (such as LA1 of FIG. 1) as the serving cell (such as the cell 114 of FIG. 1), from the top neighboring cells (such as the cells 106, 112, 116, 152, 154 of FIG. 1). Note that the set of cells, in certain circumstances, may contain as few as one cell.

Now, the mobile station selects 265 a cell (such as the cell 106 of FIG. 1) from the set of cells (such as the cells 106, 112, 116 of FIG. 1). In one example, the mobile station selects the cell based on the time-lag of the cells. That is, the mobile station compares the time-lag of all the cells in the set of cells and selects the cell with the shortest time-lag. When comparing the time-lags, the mobile station should not consider the cells from the set, whose time-lag is less than the radio frequency switching time of the mobile station. The RF switching time of the mobile station is the time that the mobile station takes to switch from the serving cell carrier frequency to another cell carrier frequency. Therefore, if a cell is selected with a time-lag that is less than the RF frequency of the mobile station, then the occurrence of the information data (that was present in the first page) will pass by before the time mobile station can switch to the carrier frequency of the selected cell.

In the above description, the time-lag is always considered positive, i.e., an identical page is repeated in another cell having the same LAI as the serving cell after the occurrence of the page in the serving cell. In a different embodiment, there may be a cell in the set of cells with negative time-lag. An identical page occurs earlier in a cell with the negative time-lag compared to the time at which the page occurs in the serving cell. Therefore, based on a previous decoding failure on a paging channel of a serving cell or based on determining that the mobile station is experiencing high-interference independently (i.e., without currently decoding the paging channel of the serving cell to read a page 230), the mobile station may select a cell from the set of cells with a negative time-lag. Thus, the mobile station may try to decode a paging channel of the selected cell before attempting to decode the paging channel of the serving cell to decode an identical page. When high interference lasts for several seconds (or more), selecting a cell with a negative time-lag allows yet another opportunity for the mobile station to decode a paging channel to read a page.

In one example, all the cells in the list of top neighboring cells having the same location area identifier as the serving cell may have negative time-lag. In such a scenario, the first occurrence of the identical page in all these cells has already passed. As a result of having negative time-lag, the re-occurrence of the page in a cell with negative time-lag will occur before the re-occurrence of the page in the serving cell. Therefore, the mobile station, after facing a decoding failure on the paging channel to read a page in the serving cell, may select a cell with a negative time-lag to read the re-occurrence of the page that will occur earlier in time compared to the re-occurrence of the page in the serving cell (instead of decoding the paging channel of the serving cell to read the re-occurrence of the page in the serving cell).

In another example, the mobile station selects the cell based on the time-lag and RSSI value and/or SNR value of the cells. In one case, if the time-lag of a particular cell is the shortest in the set of cells, but its RSSI value and/or SNR value is less compared to another cell in the set, whose time-lag is greater (compared to the former cell), then the mobile station may select the other cell. It is understood for those skilled in the art that a number of different algorithms may be used on the RSSI values, the SNR values, and the time lags to select a best candidate cell for synchronization.

After selecting a cell (such as the cell 106 of FIG. 1), the mobile station synchronizes 270 with a base station (such as the base station 107 of FIG. 1) of the selected cell. In one example, the mobile station may immediately synchronize 270 with a base station of the selected cell, after selecting the cell. In another example, after selecting a cell, the mobile station may wait for a duration of time until the identical page is about to occur on the paging channel of the selected cell, and then synchronize 270 with a base station of the selected cell. While synchronizing, the mobile station switches from the serving cell carrier frequency to the selected cell carrier frequency. But at this point, the serving base station of the mobile station does not change (for example, the base station 115 remains the serving base station of the mobile station 170 as shown in FIG. 1; i.e., the mobile station does not perform a reselection into the selected base station 107).

After synchronizing, the mobile station decodes 275 the paging channel of the selected cell to read a second page. The second page includes the same information data as the first page. And the mobile station knows the exact timing of the second page in the frames on the paging channel of the selected cell, as a result of obtaining time-lag information previously.

Now, the mobile station checks 280 if the page is correctly decoded or if a decoding failure has occurred. If the mobile station is able to correctly decode the paging channel (PCH) of the selected cell and read the second page, then the mobile station checks 285 if the page indicates a mobile terminated call. If the page indicates a mobile terminated call, then the mobile station sends an acknowledgement 290 to the base station of the selected cell on a Random Access CHannel (RACH) and subsequently, receives a message 295 from the base station of the selected cell on an Access Grant CHannel (AGCH). The message informs the mobile station about a dedicated traffic channel in the same selected cell and, finally, the mobile station establishes the call 240. Otherwise, if the page does not indicate a mobile terminated call, then the mobile station again goes back to decoding 230 the paging channel of the serving cell.

If a decoding failure occurs and the mobile station is not able to correctly decode the paging channel of the selected cell, then the mobile station checks if selecting another cell is feasible 283. The mobile station determines if decoding the paging channel of another cell provides sufficient time benefit compared to the next page occurrence in the serving cell. If the mobile station determines that there is a time benefit and decides to select another cell, then the mobile station selects 265 another cell from the set of cells, different from the earlier selected cell and reads a third page. The third page also includes the identical information data as the first page and the second page. Otherwise, if the mobile station determines that there is no time benefit and decides not to select another cell, then the mobile station again goes back to decoding 230 the paging channel of the serving cell.

Therefore, whenever the mobile station encounters a decoding failure on the paging channel of its serving cell, the mobile station decrements the counter and checks if the counter is less than zero. If the counter is not less than zero than the mobile station determines if it is experiencing high-interference. Upon determining that the mobile station is experiencing high-interference, the mobile station selects another cell and reads the page from the paging channel of the selected cell. This reduces the call-setup time as every failed attempt to read a page from the serving base station creates an opportunity for a successful attempt to read identical information of the page by decoding a paging channel of the selected cell.

As a result of decrementing the counter at every decoding failure of the serving cell page, eventually the counter may become less than zero. In such a scenario, when the mobile station checks 250 the counter and determines that it is less than zero, then the mobile station synchronizes 252 with the last selected cell. The last selected cell is the last cell that the mobile station selected from the set of cells and with which the mobile station synchronized to read a page. In an example, when the counter becomes less than zero, then the mobile station also reselects to the last selected cell (i.e., the last selected cell now becomes the serving base station of the mobile station). After synchronizing and reselection (if applicable), the mobile station decodes 254 the paging channel (PCH) of the selected cell and reads a page. In one example, while decoding the PCH of the selected cell, the mobile station performs conventional searching in the background to select a better cell. Therefore, the mobile station does not miss any page because it decodes the PCH of the selected cell. Additionally, the mobile station saves time by performing the rigorous conventional searching in the background.

In another example, the after decoding 254 the PCH of the selected cell, the mobile station uses the steps 210, 215, 220, 225, 260, and 265 of flowchart 200 to select a better cell. Thus, there are opportunities for further synchronization and camping to a base station of a better cell, such that the base station of the better cell becomes the serving base station for the mobile station.

Traditionally, when the value of the counter (DSC) becomes less than zero, the mobile station triggers a full scan and switches to another base station. Thus, conventionally the mobile station is not able to correctly decode the paging channel for a duration that is equal to the time for "n" successive decoding failures plus the time taken by the mobile station for scanning the whole network, re-camping to another base station, decoding the paging channel of the newly selected base station, and maybe the time required for a location update procedure. But by using the flowchart 200 and synchronizing 252 with the base station of the last selected cell when the counter (DSC) becomes less than zero, the mobile station skips the traditional full network scan and significantly reduces the time for reading a page and subsequently, setting-up a call.

Figure 3:
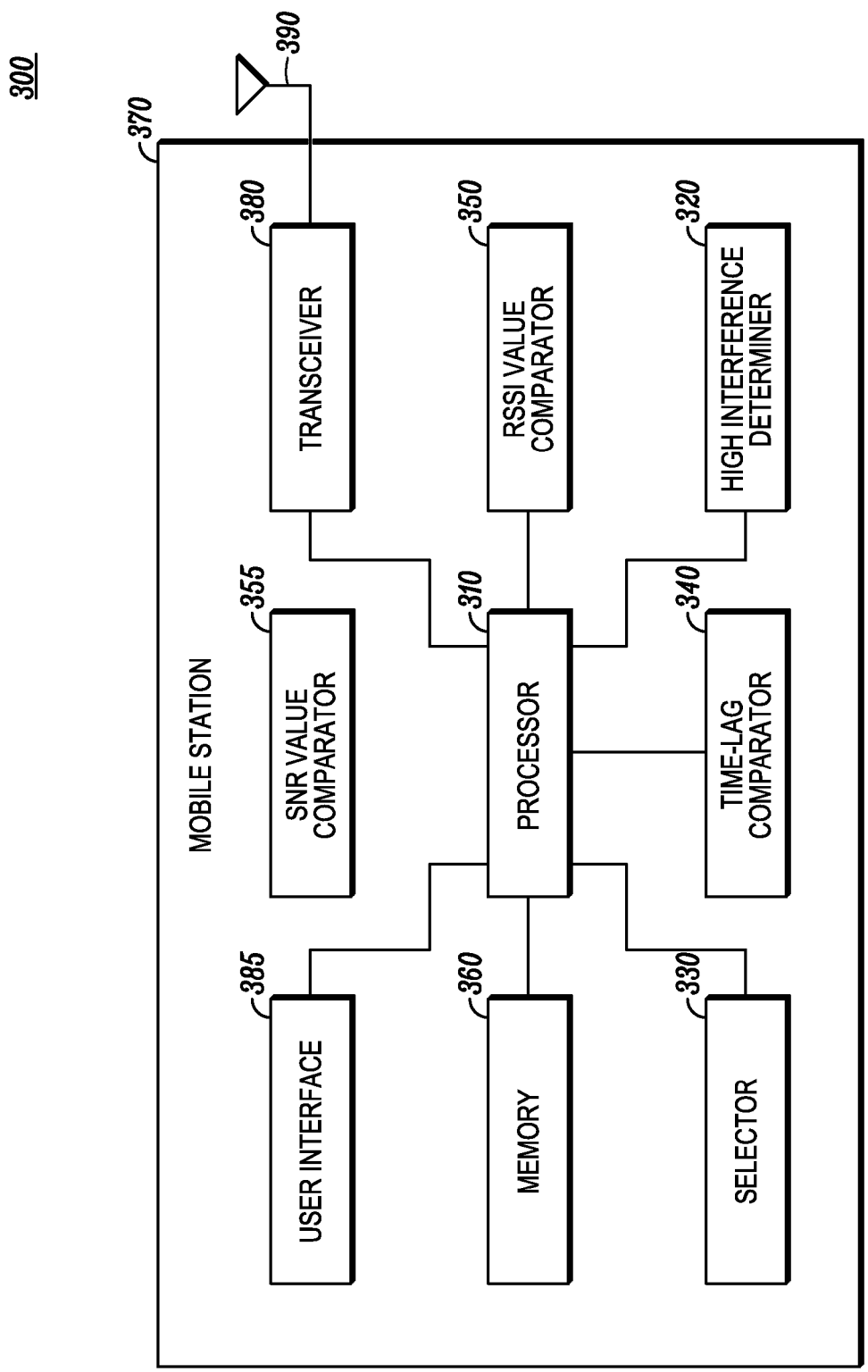
FIG. 3 is a block diagram of a mobile station in accordance with some embodiments.

FIG. 3 is a block diagram 300 of a mobile station 370 in accordance with some embodiments. As an example, the mobile station 370 is the mobile station 170 of FIG. 1. The mobile station 370 includes an antenna 390, a transceiver 380, a processor 310, a user interface 385, a memory 360, an SNR value comparator 355, an RSSI value comparator 350, a time-lag comparator 340, a high-interference determiner 320, and a selector 330. The antenna 390 receives and transmits signals. The antenna 390 is connected to the transceiver 380. The mobile station 370 works according to the method of FIG. 2.

In one example, the transceiver 380, the user interface 385, the memory 360, the SNR value comparator 355, the RSSI value comparator 350, the time-lag comparator 340, the high-interference determiner 320, and the selector 330 are coupled to the processor 310. In another example, the transceiver 380, the user interface 385, the memory 360, the SNR value comparator 355, the RSSI value comparator 350, the time-lag comparator 340, the high-interference determiner 320, and the selector 330 may be partially or completely implemented within the processor 310.

When the mobile station 370 is camped to its serving cell and is in idle mode, the processor 310 maintains a list of neighboring cells and stores the list in the memory 360. Then, the transceiver 380 scans the list of neighboring cells to determine an RSSI value, an SNR value, and a location area identifier of each cell in the list of neighboring cells. In one example, the transceiver 380 provides this information (such as the RSSI value, the SNR value, and the location area identifier of each cell) to the processor 310 and the processor 310 stores it in memory 360. The RSSI value comparator 350, coupled to the processor 310, compares the RSSI values of each cell in the list of cells and creates a list of top neighboring cells based on the RSSI value for each cell in the list of neighboring cells. In one example, the processor 310 ensures that the list of top neighboring cells always includes at least one cell having the same location area identifier as the serving cell. In another example, the RSSI value comparator 350 ensures that the list of top neighboring cells always includes at least one cell belonging to the location area identifier of the serving cell. In an example, when the list of top neighboring cells does not contain a cell having the same location area identifier as the serving cell due to any reason, then the mobile station 370 keeps trying to decode the paging channel of the serving cell and falls back to conventional behavior.

After creating the list of top neighboring cells, the processor 310, using the transceiver 380 and the antenna 390, pre-synchronizes with all the cells from the list of top neighboring cells and obtains a time-lag of each cell in the list of top neighboring cells. The processor 310 stores the obtained time-lags in the memory 360.

Meanwhile, the transceiver 380 and the antenna 390, coupled to the processor 310, try to decode the paging channel of the serving cell to read a first page and the processor 310 checks if the decoding was successful. If the processor determines that the decoding was successful, then the processor 310 checks if the page indicates a mobile terminated call. If the page indicates a mobile terminated call, then the processor 310 establishes the call. Otherwise, if the page does not indicate a mobile terminated call, than the processor 310 again goes back to decoding the paging channel of the serving cell using the transceiver 380 and the antenna 390.

Alternatively, if the processor 310 determines that it is not able to correctly decode the paging channel of the serving cell, the processor 310 decrements a counter of the serving base station. As explained earlier, in case of GSM, this counter is called Downlink Signaling Counter (DSC) and is derived by the processor 310 using the information received from the serving base station in a parameter BS_PA_M-FRMS. In one example, the initial value of this counter is always greater than zero. The processor 310 stores the initial as well as the decremented value of the counter in the memory 360. After decrementing the counter, the processor 310 checks if the counter is less than a pre-determined value. This pre-determined value may be set by a manufacturer of the mobile station or by the serving base station. In the example of FIG. 3, the pre-determined value is set to zero.

If the processor 310 determines that the counter is not less than zero, then a high-interference determiner 320, coupled to the processor 310, checks if the mobile station 370 is experiencing high-interference. In one example, the high-interference determiner 320 determines that the mobile station 370 is experiencing high-interference if there has been no sudden drop in RSSI value of the serving base station. In another example, the high-interference determiner 320 determines that the mobile station 370 is experiencing high-interference if there is a sudden drop in RSSI value of the serving base station but there is a more drastic drop in the SNR value of the serving base station. In yet another example, the high-interference determiner 320 may store the RSSI values and the SNR values of the serving base station in the memory 360 over a period of time and run an algorithm on the stored values to determine if the mobile station 370 is experiencing high-interference.

If the high-interference determiner 320 determines that the mobile station 370 is not experiencing high-interference, then the processor 310 runs a conventional re-selection algorithm and selects a new base station. On the other hand, if the high-interference determiner 320 determines that the mobile station 370 is experiencing high-interference, then the selector 330 selects a set of cells (such as the cells 106, 112, 116 of FIG. 1) from the list of top neighboring cells based on the location area identifier (such as LA1 of FIG. 1). At this point, the selector 330 only selects the cells (such as the cells 106, 112, 116 of FIG. 1) having the same location area identifier (such as LA1 of FIG. 1) as the serving cell (such as the cell 114 of FIG. 1) from the top neighboring cells (such as the cells 106, 112, 116, 152, 154 of FIG. 1).

The selector 330 further selects a cell (such as the cell 106 of FIG. 1) from the set of cells (such as the cells 106, 112, 116 of FIG. 1). In one example, the selector 330 selects the cell based on the time-lag of the cells. In this example, the time-lag comparator 340, coupled to the processor 310, compares the time-lag of all the cells in the set of cells and stores the results in the memory 360. The selector 330, coupled to the processor 310, selects the cell with the shortest time-lag that is greater than the mobile station's radio frequency switching time. In another example, the selector 330 selects the cell based on the time-lag and RSSI value and/or SNR value of the cells. In one case, if the time-lag of a particular cell is the shortest in the set of cells (yet greater than the radio frequency switching time), but its RSSI value and/or SNR value is less compared to another cell in the set, then the selector 330 may select the other cell.

In the above description, the time-lag is always considered positive, i.e., an identical page is repeated in another cell belonging to the LAI of the serving cell after the occurrence of the page in the serving cell. In a different embodiment, there may be a no cell in the set of cells with a positive time-lag, but there may be a cell in the set of cells with a negative time-lag. An identical page occurs earlier in a cell with the negative time-lag compared to the time at which the identical page occurs in the serving cell. Therefore, based on a previous decoding failure on a paging channel of a serving cell or based on determining that the mobile station is experiencing high-interference independently (i.e., without currently decoding the paging channel of the serving cell to read a page), the selector 330 may select a cell from the set of cells with a negative time-lag.

After selecting a cell (such as the cell 106 of FIG. 1) by the selector 330, the processor 310, using the transceiver 380 and the antenna 390, synchronizes with a base station (such as the base station 107 of FIG. 1) of the selected cell. After synchronizing, the processor 310, using the transceiver 380 and the antenna 390, decodes the paging channel of the selected cell to read a second page. The second page includes identical information data as the first page. And the processor 310 knows the exact timing of the second page in the frames on the paging channel of the selected cell, as a result of obtaining time-lag information.

Now, the processor 310 checks if the page is correctly decoded or if a decoding failure has occurred. If the processor 310 determines that it is able to correctly decode the paging channel of the selected cell and read the second page, then the processor 310 checks if the page indicates a mobile terminated call. If the page indicates a mobile terminated call, then the processor 310 establishes the call. In one example, the processor 310 sends an acknowledgement to the base station of the selected cell on a Random Access CHannel (RACH) and, subsequently, receives a message from the base station of the selected cell on an Access Grant CHannel (AGCH). The message informs the processor 310 about a dedicated traffic channel in the selected cell and, finally, the processor 310 establishes the call. Otherwise, if the page does not indicate a mobile terminated call, than the processor 310 again goes back to decoding the paging channel of the serving cell.

In an alternate case, when the processor 310 determines that it is not able to correctly decode the paging channel of the selected cell, then the processor 310 checks if there is an opportunity to select another cell. If the processor 310 determines that selecting another cell is feasible, then the selector 330 selects another cell from the set of cells, different from the earlier selected cell, and reads a third page. The third page also includes identical information data as the first page and the second page. Otherwise, if the processor 310 determines that selecting another cell is not feasible, then the processor 310 goes back to the idle mode.

Therefore, whenever the processor 310 encounters a decoding failure on the paging channel of its serving cell, the processor 310 decrements the counter and checks if the counter is less than zero. As a result of decrementing the counter at every decoding failure, eventually the counter may become less than zero. In such a scenario, when the processor 310 checks the counter and determines that it is less than zero, then the processor 310, using the transceiver 380 and the antenna 390, synchronizes with the last selected cell. The last selected cell is the most recent cell that the selector 330 selected from the set of cells and with which the processor 310 synchronized to read a page. In this case, when the counter becomes less than zero, then the processor also camps to the last selected cell (i.e., the last selected cell now becomes the serving base station of the mobile station). After synchronizing and camping, the processor 310 decodes the paging channel of the selected cell and performs conventional background searching with the opportunity to camp to a better base station.

By making use of the fact that the MTSO pages the notification information of an incoming call to all the base stations having the same current location area identifier as the mobile station, the mobile station can decode the paging channel of another cell, having the same location area identifier, to read a copy of the page. Thus, by decoding the paging channel of another cell upon determining that the mobile station is experiencing high-interference, the mobile station is able to improve success rate of call-setup and reduce the call-setup time because every failed attempt to read a page from the serving base station can be followed by an attempt to read identical information of the page by decoding a paging channel of another cell.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A method for a mobile station in a serving cell having a location area identifier and synchronized with a serving base station, the method comprising:
checking if the mobile station is experiencing high-interference;
selecting a cell from a list of top neighboring cells, if the mobile station is experiencing high-interference, based on a time-lag of each cell in the list of top neighboring cells and the location area identifier of the serving cell;
synchronizing with a base station of the selected cell; and
decoding a paging channel of the selected cell to read a second page.

2. The method of claim 1, wherein checking is performed if a paging channel decoding failure occurred during decoding of a paging channel of the serving cell to read a first page.

3. The method of claim 2 further comprising:
decrementing a counter of the mobile station, if a paging channel decoding failure occurred during the decoding.

4. The method of claim 3 further comprising:
synchronizing with the base station of the selected cell, if the counter has reached a pre-determined value, wherein the base station of the selected cell becomes a current serving base station for the mobile station;

decoding a paging channel of the current serving base station to read a third page.

5. The method of claim 4 further comprising:
performing a background scan of a plurality of available neighboring cells to search for a better neighbor cell; and
synchronizing with the base station of the better neighbor cell, wherein the base station of the better neighbor cell becomes a subsequent current serving base station for the mobile station.

6. The method of claim 2 further comprising:
determining if the second page indicates a mobile station terminated call, if the decoding the paging channel of the selected cell successfully reads the second page;
sending an acknowledgement to the base station of the selected cell on a random access channel (RACH), if the second page indicates a mobile station terminated call;
receiving a message from the base station of the selected cell on an access grant channel (AGCH), wherein the message informs the mobile station about a dedicated channel; and
establishing the mobile station terminated call using the dedicated channel.

7. The method of claim 2 further comprising:
checking if selecting another cell is feasible, if a paging channel decoding failure occurred during the decoding the paging channel of the selected cell;
selecting another cell from the list of top neighboring cells based on a time-lag of each cell in the list of top neighboring cells and the location area identifier of the serving cell, if selecting another cell is feasible;
synchronizing with the base station of the selected another cell; and
decoding a paging channel of the selected another cell to read a third page.

8. The method of claim 7, wherein checking further comprises:
determining if the decoding a paging channel of the selected another cell to read a third page provides a time benefit compared to decoding the paging channel of the serving cell to read a fourth page.

9. The method of claim 2, wherein the first page and the second page include identical information.

10. The method of claim 1 further comprising:
scanning a plurality of neighboring cells to determine an RSSI value for each cell of the plurality of neighboring cells;
creating the list of top neighboring cells based on the RSSI value for each cell of the plurality of neighboring cells, wherein the list of top neighboring cells includes at least one cell having the location area identifier of the serving base station; and
pre-synchronizing with each base station of the list of top neighboring cells to obtain a time-lag of each cell in the list of top neighboring cells, before the checking if the mobile station is experiencing high-interference.

11. The method of claim 1, wherein the mobile station is experiencing high-interference when a paging channel decoding failure occurs and there is no sudden drop in an RSSI value of the serving cell.

12. The method of claim 1, wherein the selected cell has a most favorable combination of time-lag, RSSI value, SNR value.

13. The method of claim 1, wherein the mobile station is experiencing high-interference when a paging channel decoding failure occurs and there is a sudden drop in an RSSI value and a sudden drop in an SNR value of the serving cell.

14. The method of claim 1, wherein selecting a cell further comprises:
comparing time-lags, RSSI values, and SNR values of each cell of the list of top neighboring cells.

15. The method of claim 14, wherein the selected cell has a shortest time-lag of each cell in the list of top neighboring cells, wherein the shortest time-lag is greater than a minimum radio frequency switching time of the mobile station.

16. A mobile station in a serving cell having a location area identifier and synchronized with a serving base station, the mobile station comprising:
a high-interference determiner, coupled to a processor, for checking if the mobile station is experiencing high-interference;
a selector, coupled to the processor, for selecting a set of cells from a list of top neighboring cells, if the mobile station is experiencing high-interference, based on at least time-lags of each cell in the list of top neighboring cells, wherein each cell of the list of top neighboring cells has the location area identifier of the serving cell; and
the processor, for synchronizing with a base station of the selected cell and for decoding a paging channel of the selected cell to read a second page.

17. The mobile station of claim 16, wherein the high-interference determiner checks if a paging channel decoding failure occurred during decoding of a paging channel of the serving cell to read a first page.

18. The mobile station of claim 16 further comprising:
a transceiver, coupled to the processor, for scanning a plurality of neighboring cells to determine an RSSI value and an SNR value for each cell of the plurality of neighboring cells.

19. The mobile station of claim 18, further comprising:
an SNR value comparator, coupled to the processor, for comparing the SNR value of each cell of the plurality of neighboring cells.

20. The mobile station of claim 18, further comprising:
an RSSI value comparator, coupled to the processor, for comparing the RSSI value of each cell of the plurality of neighboring cells and creating the list of top neighboring cells based on the RSSI value for each cell of the plurality of neighboring cells.

21. The mobile station of claim 20, wherein the processor pre-synchronizes with each base station of the list of top neighboring cells to obtain a time-lag of each cell in the list of top neighboring cells.

22. The mobile station of claim 21, further comprising:
a memory, coupled to the processor, for storing at least the list of top neighboring cells, the time-lag of each cell of the list of top neighboring cells, and the RSSI value for each cell of the plurality of neighboring cells.

23. The mobile station of claim 20, wherein the selector selects the cell from the set of cells, based on at least time-lag and RSSI value of each cell in the list of top neighboring cells.

24. The mobile station of claim 16, further comprising:
a time-lag comparator, coupled to the processor, for comparing time-lags of each cell in the set of cells.

* * * * *